United States Patent [19]

Oishi

[11] Patent Number: 4,699,268
[45] Date of Patent: Oct. 13, 1987

[54] MAGNETIC RECORDING DISK CARTRIDGE

[75] Inventor: Kengo Oishi, Odawara, Japan

[73] Assignee: Fuji Photo Film Co., Ltd., Japan

[21] Appl. No.: 6,319

[22] Filed: Jan. 14, 1987

Related U.S. Application Data

[63] Continuation of Ser. No. 798,326, Nov. 15, 1985, abandoned.

[30] Foreign Application Priority Data

Nov. 20, 1984 [JP] Japan .................................. 59-176298

[51] Int. Cl.⁴ ............................................. B65D 85/57
[52] U.S. Cl. ...................... 206/313; 206/312; 206/444; 360/128
[58] Field of Search ............... 206/309, 311, 312, 313, 206/444; 360/99, 128, 131, 138

[56] References Cited

U.S. PATENT DOCUMENTS

| 4,084,691 | 4/1978 | Leedom | 206/444 |
|---|---|---|---|
| 4,254,864 | 3/1981 | Mikura | 206/444 |
| 4,263,634 | 4/1981 | Chenoweth et al. | 206/444 |
| 4,277,810 | 7/1981 | Helmrich | 206/444 |
| 4,375,658 | 3/1983 | Martinelli | 360/99 |
| 4,413,298 | 11/1983 | Pecsok et al. | 206/313 |
| 4,417,291 | 11/1983 | Miklos et al. | 206/444 |
| 4,443,874 | 4/1984 | Steenberg | 206/312 |
| 4,476,978 | 10/1984 | Saito | 206/444 |
| 4,479,579 | 10/1984 | Miklos | 206/444 |
| 4,499,516 | 2/1985 | Purdy et al. | 360/133 |
| 4,520,470 | 5/1985 | d'Alayer de Costemore d'Arc | 360/133 |
| 4,562,504 | 12/1985 | Miklos | 206/444 |
| 4,586,606 | 5/1986 | Howey | 206/444 |

FOREIGN PATENT DOCUMENTS

| 1243226 | 8/1960 | France | 206/312 |
|---|---|---|---|
| 1364881 | 8/1974 | United Kingdom | 206/312 |
| 2026434 | 8/1980 | United Kingdom | 206/312 |

Primary Examiner—Stephen Marcus
Assistant Examiner—David T. Fidei
Attorney, Agent, or Firm—Pasquale A. Razzano

[57] ABSTRACT

A magnetic recording disk cartridge is provided with a liner on the inner surface thereof. The liner is formed of unwoven fabric of a textile blend of rayon and polyester, for instance, and is kept in contact with the recording surface of the recording disk under a light pressure to remove dust on the recording surface while the recording disk is rotated. At least a part of the inner part of the liner in contact with the inner part of the recording region of the recording disk is thicker than the outer part in contact with the outer part of the recording region.

3 Claims, 4 Drawing Figures

MAGNETIC RECORDING DISK CARTRIDGE

This application is a continuation of application Ser. No. 798,326 filed Nov. 15, 1985, now abandoned.

BACKGROUND OF THE INVENTION

1. Field of the Invention

This invention relates a magnetic recording disk cartridge comprising a casing and a magnetic recording disk accommodated therein for rotation, and more particularly to an improvement in cleaning means for the magnetic recording disk.

2. Description of the Prior Art

There has come into wide use as a recording medium for computers a floppy disk which is a flexible disk of polyester resin or the like bearing a magnetic layer on each side thereof and on which digital information is recorded by a magnetic head while the recording disk is rotated.

Recently, there has been proposed a so-called electronic camera in which, instead of a conventional silver salt photographic film which cannot be reused, a magnetic recording disk which is smaller than the floppy disk both in thickness and diameter and is generally referred to as "a micro floppy disk" is used as a recording medium. Generally the micro floppy disk for the electronic camera is accommodated in a hard casing to form a cartridge. The micro floppy disk comprises a circular magnetic recording medium which is small in diameter and is extremely thin, and a hub fixed to the center of the recording medium. The hard casing has a hub opening through which the hub is exposed and a magnetic head receiving opening formed in at least one side wall thereof.

The magnetic recording disk cartridges including the floppy disk and the micro floppy disk are generally provided with a liner on the inner surface of the casing. The liner is formed of unwoven fabric of a textile blend of rayon and polyester, for instance, and is kept in contact with the recording surface of the recording disk under a light pressure to remove dust on the recording surface while the recording disk is rotated. The liner has a width at least equal to the width of the recording region of the magnetic recording disk, and is pressed against the recording surface under a uniform pressure over the entire width thereof. However, since the amount of information recorded during one rotation of the disk does not differ between the outer part and the inner part of the recording region and the linear velocity is smaller in the inner part than in the outer part, the recording wavelength is shorter in the inner part of the recording region than in the outer part of the recording region. Therefore, even fine dust which could give rise to hardly any problem on the outer part of the recording region can cause drop-out and the like when it is deposited on the inner part of the recording region. Accordingly, when the liner is pressed against the recording surface under a uniform pressure required to clean the recording surface to an extent enough for the outer part of the recording region, the inner part of the recording region cannot be cleaned enough. On the other hand, when the liner is pressed against the recording surface under a higher uniform pressure, the running torque of the recording disk or the torque required to rotate the recording disk is increased, which is practically undesirable.

SUMMARY OF THE INVENTION

In view of the foregoing observations and description, the primary object of the present invention is to provide a magnetic recording disk cartridge having a liner for cleaning the recording disk which can clean the inner part of the recording region of the recording disk to a sufficient extent without substantially increasing the running torque of the recording disk.

The magnetic recording disk cartridge of the present invention is characterized in that at least a part of the inner part of the liner in contact with the inner part of the recording region of the recording disk is thicker than the outer part in contact with the outer part of the recording region.

Since the inner part of the liner is thicker than the outer part and accordingly is pressed against the recording surface under a pressure higher than the outer part, the cleaning effect of the liner becomes better in the inner part than in the outer part.

The difference in thickness between the thickened part and the rest part of the recording disk may be determined taking into account the drop-out generation rate, the running torque of the recording disk, and the like.

DESCRIPTION OF THE PREFERRED EMBODIMENTS

Figure 1:
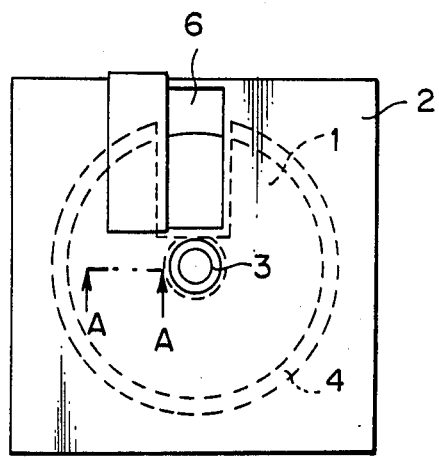
FIG. 1 is a schematic plan view of a magnetic recording disk cartridge in accordance with an embodiment of the present invention.
Figure 2:
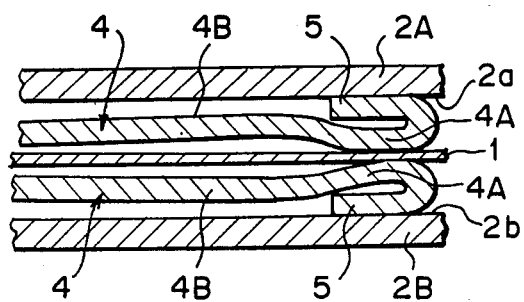
FIG. 2 is a cross-sectional view taken along line A—A in FIG. 1.
Figure 3:
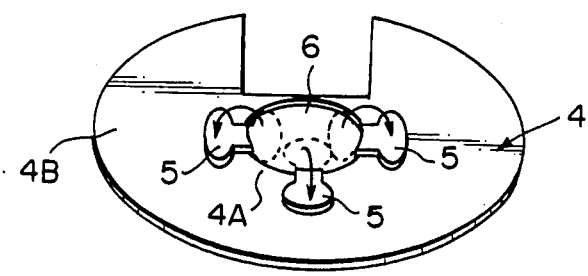
FIG. 3 is a perspective view showing the liner employed in the magnetic recording disk cartridge of FIG. 1.

In FIGS. 1 to 3, a magnetic recording disk 1 is accommodated in a cartridge case 2 for rotation about a center core 3 fixed to the center thereof. The cartridge case 2 comprises upper and lower halves 2A and 2B. The upper and lower halves 2A and 2B are provided with cleaning liners 4 on the respective inner surfaces 2a and 2b opposed to the sides of the recording disk 1. The liners 4 are of unwoven fabric of rayon, polyester or the like, and substantially circular in shape having a diameter substantially equal to that of the recording disk 1. The liners 4 are fixed to the inner surfaces 2a and 2b at several points, for instance, by heat seal. Though the liners 4 are substantially circular in shape in this particular embodiment, the liners 4 may be of other various shapes provided that they have a width at least equal to the width of the recording region of the recording disk 1.

The inner portion 4A of each liner 4 to be in contact with the inner portion of the recording region of the recording disk 1 is provided with doubled portions 5.

As clearly shown in FIG. 3, each liner 4 is provided with a central opening 6 for receiving the center core 3 of the recording disk 1. The doubled portions 5 are formed by leaving the material of the liner 4 in a shape shown by the dotted lines in FIG. 3 when the central opening is cut and folding the leavings in the directions of the arrows. Accordingly the doubled portions 5 are twice as thick as the outer portion 4B to be in contact with the outer portion of the recording region of the recording disk 1. Therefore, the liners 4a are pressed against the recording disk 1 under a higher pressure in the inner portion 4A than in the outer portion 4B. Accordingly the cleaning effect of the cleaning liners 4 is enhanced in the inner portion. Since the inner portion is thickened by forming the doubled portions in this embodiment, the thickened portions are twice as thick as the outer portions. However, by forming recesses for accommodating the doubled portions 5 on the inner surfaces of the casing 2 and by selecting the depth of the recesses, the pressure under which the doubled portions 5 are pressed against the recording disk 1 can be adjusted.

By partly thickening the inner portion of the liner 4 by folding the liner material to form doubled portions on the inner portion of the liner as in this embodiment, the inner portion of the liner can be partly thickened very easily without substantially increasing the manufacturing cost of the liner. However, the inner portion of the liner may be partly thickened by other various methods.

Figure 4:
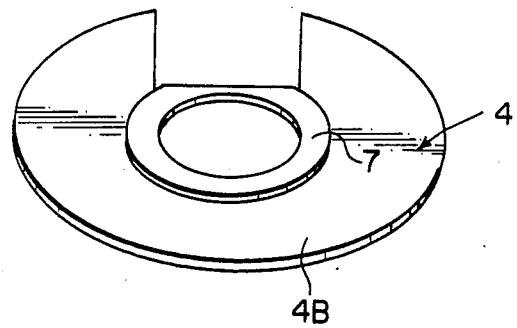
FIG. 4 is a perspective view showing a modification of the liner.

For example, the inner portion of the liner may be thickened by bonding an annular member 7 as shown in FIG. 4. The annular member 7 may be of the same material or of other buffer materials. Further, the inner portion of the liner can be thickened by increasing the thickness of the liner material at a part corresponding to the inner portion of the liner to be produced when manufacturing the liner material.

I claim:

1. A magnetic recording disk cartridge comprising a casing having at least two opposed inner surfaces, a magnetic recording disk having recording regions thereon accommodated in the casing for rotation within said casing, a cleaning liner for cleaning said recording regions of said disk during rotation of said disk by relative motion between said recording regions and said liner, said cleaning liner being provided on at least one of the opposed inner surfaces of the casing to be in contact with the opposed recording region of the recording disk, said contact being such as to permit rotation of said disk within said casing, said cleaning liner characterized by having at least one thickened part which is formed in the radially inner portion of the liner in contact with the radially inner portion of the recording region of the recording disk, said thickened part being thicker than the radially outer portion of the liner in contact with the radially outer portion of the recording region so that the radially inner portion of said cleaning liner imparts a relatively greater contact pressure to the radially inner portion of the recording region than the radially outer portion of said cleaning liner imparts to the radially outer portion of the recording region.

2. A magnetic recording disk cartridge as defined in claim 1, in which said cleaning liner has an interior side opposing said inner surface of said casing and an exterior side in contact with said recording region of said recording disk, and in which said thickened part is formed by doubling the liner material on the interior side of the cleaning liner.

3. A magnetic recording disk cartridge as defined in claim 1, in which said cleaning liner has an interior side opposing said inner surface of said casing and an exterior side in contact with said recording region of said recording disk, and in which said thickened part is formed by bonding a member to the part of the liner material on the interior side of the cleaning liner.

* * * * *